(12) United States Patent
Petermann et al.

(10) Patent No.: US 9,587,037 B2
(45) Date of Patent: Mar. 7, 2017

(54) PROCESS FOR RECOVERING AN ESTERIFIED CELLULOSE ETHER FROM A REACTION PRODUCT MIXTURE

(71) Applicant: Dow Global Technologies LLC, Midland, MI (US)

(72) Inventors: Oliver Petermann, Hamburg (DE); Matthias Sprehe, Walsrode (DE); Robert Appell, Midland, MI (US); Robert Nilsson, Midland, MI (US)

(73) Assignee: Dow Global Technologies LLC

( * ) Notice: Subject to any disclaimer, the term of this patent is extended or adjusted under 35 U.S.C. 154(b) by 0 days.

(21) Appl. No.: 15/022,418

(22) PCT Filed: Sep. 15, 2014

(86) PCT No.: PCT/US2014/055592
§ 371 (c)(1),
(2) Date: Mar. 16, 2016

(87) PCT Pub. No.: WO2015/041973
PCT Pub. Date: Mar. 26, 2015

(65) Prior Publication Data
US 2016/0222133 A1    Aug. 4, 2016

Related U.S. Application Data

(60) Provisional application No. 61/881,009, filed on Sep. 23, 2013.

(51) Int. Cl.
| | | |
|---|---|---|
| *C08B 13/00* | (2006.01) |
| *A61K 8/28* | (2006.01) |
| *G03C 1/835* | (2006.01) |
| *C08B 11/20* | (2006.01) |
| *C08B 11/22* | (2006.01) |
| *C08B 17/00* | (2006.01) |

(52) U.S. Cl.
CPC .............. *C08B 13/00* (2013.01); *C08B 11/20* (2013.01); *C08B 11/22* (2013.01); *C08B 17/00* (2013.01)

(58) Field of Classification Search
CPC ............ C08B 13/00; A61K 9/28; G03C 1/835
USPC .................................. 536/66; 424/480, 482
See application file for complete search history.

(56) References Cited

U.S. PATENT DOCUMENTS

| | | | |
|---|---|---|---|
| 3,435,027 A | 3/1969 | Desmarais Armand et al. |
| 3,525,735 A | 8/1970 | Miller |
| 4,226,981 A | 10/1980 | Onda et al. |
| 4,365,060 A | 12/1982 | Onda et al. |
| 5,776,501 A | 7/1998 | Kokubo et al. |
| 2004/0152886 A1 | 8/2004 | Cho et al. |
| 2011/0091360 A1 | 4/2011 | Hassan et al. |

FOREIGN PATENT DOCUMENTS

| | | |
|---|---|---|
| EP | 0219426 | 4/1987 |
| WO | 2005115330 | 12/2005 |
| WO | 2011159626 | 12/2011 |
| WO | 2013148154 | 10/2013 |

*Primary Examiner* — Sudhakar Katakam
*Assistant Examiner* — Everett White

(57) ABSTRACT

A process for recovering an esterified cellulose ether from a reaction product mixture obtained from a reaction of (a) a cellulose ether with (b) an aliphatic monocarboxylic acid anhydride or a di- or tricarboxylic acid anhydride or a combination of an aliphatic monocarboxylic acid anhydride and a di- or tricarboxylic acid anhydride, comprises the steps of (i) contacting the reaction product mixture with an aqueous liquid to precipitate the esterified cellulose ether from the reaction product mixture, (ii) isolating the precipitated esterified cellulose ether from the mixture obtained in step (i), and (iii) suspending the isolated esterified cellulose ether in an aqueous liquid to provide a suspension having a temperature of at least 28° C., and (iv) recovering the esterified cellulose ether from the suspension of step (iii).

15 Claims, No Drawings

PROCESS FOR RECOVERING AN ESTERIFIED CELLULOSE ETHER FROM A REACTION PRODUCT MIXTURE

FIELD

The present invention relates to an improved process for recovering an ester of a cellulose ether from a reaction product mixture.

INTRODUCTION

Esters of cellulose ethers, their uses and processes for preparing them are generally known in the art. One process for producing cellulose ether-esters is described in U.S. Pat. No. 3,435,027.

Hydroxypropyl methyl cellulose acetate succinate (HPMCAS), hydroxypropyl methyl cellulose acetate (HPMCA) and hydroxypropyl methyl cellulose phthalate (HPMCP) are useful in pharmaceutical dosage forms. HPMCAS is useful as an enteric polymer for pharmaceutical dosage forms. Enteric polymers are those that remain intact in the acidic environment of the stomach. Dosage forms coated with such polymers protect the drug from inactivation or degradation in the acidic environment or prevent irritation of the stomach by the drug.

In a conventional method of preparing esters of cellulose ethers, such as HPMCAS, HPMCA or HPMCP, cold water is poured to the reaction product mixture in order to initiate the precipitation of the product and to dilute and remove the impurities. However, applying this method, esters of cellulose ethers in the form of a fine powder or granules cannot be obtained because inter-particle coagulation occurs to a very large extent. Esterified cellulose ethers, such as HPMCAS or HPMCA, tend to exhibit a very tacky nature in the reaction product mixture in the presence of an aliphatic carboxylic acid, such as acetic acid, and an alkali metal carboxylate, such as sodium acetate. The inter-particle coagulation prevents water from penetrating between the particles, so that it becomes difficult to effectively remove impurities like acetic acid, sodium acetate, succinic acid, phthalic acid, unreacted hydroxypropyl methyl cellulose (HPMC) and others. Moreover, additional milling or crushing of the product is required to obtain a granular product.

Several methods have been suggested to address this problem.

U.S. Pat. No. 4,226,981 discloses a process for preparing mixed esters of cellulose ethers, such as HPMCAS, by esterifying hydroxypropyl methyl cellulose with succinic anhydride and acetic anhydride in the presence of an alkali carboxylate, such as sodium acetate, as the esterification catalyst and acetic acid as the reaction medium. After completion of the esterification reaction, a large volume of water, specifically 10 times by volume of water, is added to the reaction product mixture so that the reaction product is precipitated. The precipitated product is then subjected to a thorough washing with water to remove impurities and dried to produce a mixed ester in the powdery or granular form.

International Patent Application WO 2005/115330 discloses HPMCAS and HPMCA polymers with a specific combination of substitution levels. HPMCAS and HPMCA are produced in a similar manner as described in U.S. Pat. No. 4,226,981. Once the reaction is complete, a large volume of water is added to the reaction product mixture so that HPMCAS or HPMCA is precipitated. The precipitated product is then subjected to thorough washing with water to remove impurities.

European Patent Application EP 0 219 426 discloses a process for producing HPMCP or HPMCAS, followed by addition of a large amount of water to the reaction product mixture and the precipitate formed in the mixture is collected by filtration and repeatedly washed with water until the washing precipitate is no longer acidic.

US Patent Application Publication No. US 2004/0152886 addresses the need of preventing coagulation of HPMCP particles so that impurities like phthalic acid and acetic acid present between the particles can contact with water and be washed away. US 2004/0152886 suggests increasing the fluidity of the reaction product mixture by adding a fluidization solvent as a post-treatment process, and spraying it into water through a spray nozzle.

In the co-pending International patent application PCT/US13/030394, filed 12 Mar. 2013 by inventors of the present patent application and published on 3 Oct. 2013 as WO 2013/148154, an improved process is described for precipitating an esterified cellulose ether from its reaction product mixture. According to this method a reaction product mixture comprising the esterified cellulose ether is contacted with water and the combination of water and the reaction product mixture is subjected to a shear rate of at least 800 $s^{-1}$. Substantial coagulation of the particles of the esterified cellulose ether during or after precipitation and during the washing of the esterified cellulose ether can be prevented. A non-tacky finely powdered ester of a cellulose ether is obtained.

Whichever method is applied to obtain esterified cellulose ethers of fine particle size, the esterified cellulose ethers are typically thoroughly and repeatedly washed to achieve a high purity. Particularly those esterified cellulose ethers that are intended for pharmaceutical applications require a very high purity. Purification is typically conducted by suspending the esterified cellulose ether in an aqueous liquid and recovering the esterified cellulose ether from the suspension by filtration, centrifugation, decantation or a combination thereof.

However, as esterified cellulose ether solids become more friable with increased purity, and fines are produced by processing, e.g. shearing, of friable solids, it becomes more and more difficult to separate the esterified cellulose ether from the aqueous liquid by filtration centrifugation or decantation. Very fine particle size is observed when the purification steps include the use of devices that have a high shear effect. After separation of the esterified cellulose ether from the aqueous liquid by filtration, centrifugation, decantation or a combination thereof, the esterified cellulose ether is still very wet and has to be dried by other means, e.g., by heated air. The more wet the mass of esterified cellulose ether is after filtration, centrifugation, decantation, the higher is its loss on drying (LOD) and the more energy and time is required for drying the esterified cellulose ether. Moreover, a high LOD of the esterified cellulose ether, i.e., a high amount of aqueous liquid trapped in the solid mass of esterified cellulose ether, is undesirable because the aqueous liquid contains water-soluble impurities like sodium acetate or acetic acid, which remain in the esterified cellulose ether upon drying.

Accordingly, one object of the present invention is to find a process for washing an esterified cellulose ether with an aqueous liquid wherein the separability of the washed esterified cellulose ether from the aqueous liquid is improved.

Another one object of the present invention is to find a method of reducing the loss on drying of a humid mass of solid esterified cellulose ether.

A preferred object of the present invention is to find a process for washing an esterified cellulose ether with an aqueous liquid wherein a very high purity of the washed esterified cellulose ether is achieved.

SUMMARY

Surprisingly, it has been found that the separability of an esterified cellulose ether from an aqueous liquid is improved and the loss on drying and the amount of impurities in the resulting humid mass of solid esterified cellulose ether is reduced if the esterified cellulose ether is subjected to a suspension step as claimed in the present invention.

Accordingly, one aspect of the present invention is a process for recovering an esterified cellulose ether from a reaction product mixture obtained from a reaction of (a) a cellulose ether with (b) an aliphatic monocarboxylic acid anhydride or a di- or tricarboxylic acid anhydride or a combination of an aliphatic monocarboxylic acid anhydride and a di- or tricarboxylic acid anhydride, wherein the process comprises the steps of
(i) contacting the reaction product mixture with an aqueous liquid to precipitate the esterified cellulose ether from the reaction product mixture,
(ii) isolating the precipitated esterified cellulose ether from the mixture obtained in step (i),
(iii) suspending the isolated esterified cellulose ether in an aqueous liquid to provide a suspension having a temperature of at least 28° C., and
(iv) recovering the esterified cellulose ether from the suspension of step (iii).

Another aspect of the present invention is a process for preparing an ester of a cellulose ether wherein (a) a cellulose ether is reacted with (b) an aliphatic monocarboxylic acid anhydride or a di- or tricarboxylic acid anhydride or a combination of an aliphatic monocarboxylic acid anhydride and a di- or tricarboxylic acid anhydride, and the esterified cellulose ether is recovered from the reaction product mixture according to the above-mentioned process.

Yet another aspect of the present invention is a method of improving the separability of an esterified cellulose ether from an aqueous liquid in a process which comprises the steps of suspending an esterified cellulose ether to be purified in an aqueous liquid to provide a suspension, and recovering the esterified cellulose ether from the suspension by filtration, centrifugation, decantation or a combination thereof, wherein the temperature of the suspension is adjusted to at least 28° C. before the esterified cellulose ether is recovered from the suspension.

Yet another aspect of the present invention is a method of reducing the loss on drying of a humid mass of a solid esterified cellulose ether which comprises the steps of suspending the humid mass of solid esterified cellulose ether in an aqueous liquid to provide a suspension, and recovering the esterified cellulose ether from the suspension by filtration, centrifugation, decantation or a combination thereof, wherein the temperature of the suspension is adjusted to at least 28° C. before the esterified cellulose ether is recovered from the suspension.

DETAILED DESCRIPTION (DESCRIPTION OF EMBODIMENTS)

According to the process of the present invention an esterified cellulose ether is recovered as described further below from a reaction product mixture that has been obtained from a reaction of (a) a cellulose ether with (b) an aliphatic monocarboxylic acid anhydride or with a di- or tricarboxylic acid anhydride or with a combination of an aliphatic monocarboxylic acid anhydride and a di- or tricarboxylic acid anhydride, optionally in the presence of (c) an aliphatic carboxylic acid and optionally (d) an alkali metal carboxylate.

The cellulose ether (a) used as a starting material for the esterification reaction preferably is an alkyl cellulose, hydroxyalkyl cellulose or hydroxyalkyl alkylcellulose. The hydroxyalkoxy groups are typically hydroxymethoxy, hydroxyethoxy and/or hydroxypropoxy groups. Hydroxyethoxy and/or hydroxypropoxy groups are preferred. Preferably a single kind of hydroxyalkoxy group, more preferably hydroxypropoxy, is present in the cellulose ether. The alkoxy groups are typically methoxy, ethoxy and/or propoxy groups. Methoxy groups are preferred. Illustrative of the above-defined cellulose ethers are methylcellulose, ethylcellulose, and propylcellulose; hydroxyethylcellulose, hydroxypropylcellulose, hydroxyethyl methylcellulose, ethyl hydroxyethylcellulose, hydroxymethyl ethylcellulose, hydroxypropyl methylcellulose, hydroxypropyl ethylcellulose, hydroxybutyl methylcellulose, and hydroxybutyl ethylcellulose. More preferably, the cellulose ether is a hydroxypropyl methylcellulose.

The cellulose ether used as a starting material for the esterification reaction preferably has a viscosity of from 1.20 to 200 mPa·s, more preferably from 2.0 to 100 mPa·s, most preferably from 2.5 to 50 mPa·s, and in particular from 3 to 30 mPa·s, measured as a 2 weight-% aqueous solution at 20° C. according to ASTM D2363-79 (Reapproved 2006).

The average number of hydroxyl groups substituted by alkoxy groups, such as methoxy groups, per anhydroglucose unit, is designated as the degree of substitution of alkoxy groups (DS). In the above-given definition of DS, the term "hydroxyl groups substituted by alkoxy groups" does not only include alkylated hydroxyl groups directly bound to the carbon atoms of the cellulose backbone, but also alkylated hydroxyl groups of hydroxyalkoxy substituents bound to the cellulose backbone. Most preferably, the cellulose ether is a hydroxypropyl methylcellulose with a $DS_{methoxyl}$ of from 1.1 to 2.1, more preferably 1.75 to 2.05 and an $MS_{hydroxypropoxyl}$ of from 0.05 to 1.1, more preferably from 0.15 to 0.4. The $DS_{methoxyl}$ and $MS_{hydroxypropoxyl}$ are determined according to United States Pharmacopeia and National Formulary, Hypromellose (hydroxproyl methyl cellulose).

The cellulose ether (a) is reacted with (b) an aliphatic monocarboxylic acid anhydride or with a di- or tricarboxylic acid anhydride or with a combination of an aliphatic monocarboxylic acid anhydride and a di- or tricarboxylic acid anhydride. Preferred aliphatic monocarboxylic acid anhydrides are selected from the group consisting of acetic anhydride, butyric anhydride and propionic anhydride. Preferred dicarboxylic acid anhydrides are selected from the group consisting of succinic anhydride, maleic anhydride and phthalic anhydride. A preferred tricarboxylic acid anhydride is trimellitic anhydride. A preferred aliphatic monocarboxylic acid anhydride can be used alone; or a preferred di- or tricarboxylic acid anhydride can be used alone; or a preferred aliphatic monocarboxylic acid anhydride can be used in combination with a preferred di- or tricarboxylic acid anhydride.

The production of the following esterified cellulose ethers from the above-mentioned cellulose ethers, aliphatic monocarboxylic acid anhydrides and di- or tricarboxylic acid anhydrides is particularly preferred:
  i) HPMC-XY and HPMC-X, wherein HPMC is hydroxypropyl methyl cellulose, X is A (acetate), or X is B (butyrate)

or X is Pr (propionate) and Y is S (succinate), Y is P (phthalate), Y is M (maleate) or Y is T (trimellitate), such as hydroxypropyl methyl cellulose acetate phthalate (HPMCAP), hydroxypropyl methyl cellulose acetate trimellitate (HPMCAT), hydroxypropyl methyl cellulose acetate maleate (HPMCAM) or hydroxypropyl methylcellulose acetate succinate (HPMCAS); or ii) hydroxypropyl methyl cellulose phthalate (HPMCP); hydroxypropyl cellulose acetate succinate (HPCAS), hydroxybutyl methyl cellulose propionate succinate (HBMCPrS), hydroxyethyl hydroxypropyl cellulose propionate succinate (HEHPCPrS); and methyl cellulose acetate succinate (MCAS).

Hydroxypropyl methylcellulose acetate succinate (HPMCAS) is the most preferred esterified cellulose ether.

The esterification of the cellulose ether can be conducted in a known manner, for example as described in U.S. Pat. Nos. 3,435,027 and 4,226,981, in the International Patent Application WO 2005/115330, or in European Patent Application EP 0 219 426. The esterification of the cellulose ether is preferably conducted in (c) an aliphatic carboxylic acid as a reaction medium, such as acetic acid, propionic acid, or butyric acid. The reaction medium can comprise minor amounts of other solvents or diluents which are liquid at room temperature and do not react with the cellulose ether, such as halogenated $C_1$-$C_3$ derivatives, such as dichloro methane, or dichloro methyl ether, but the amount of the aliphatic carboxylic acid is preferably more than 50 percent, more preferably at least 75 percent, and even more preferably at least 90 percent, based on the total weight of the reaction medium. Most preferably the reaction medium consists of an aliphatic carboxylic acid. The esterification reaction is generally conducted in the presence of 100 to 2,000 parts by weight of an aliphatic carboxylic acid as the reaction medium per 100 parts by weight of the cellulose ether.

The esterification reaction is preferably conducted in the presence of (d) an esterification catalyst, more preferably in the presence of an alkali metal carboxylate, such as sodium acetate or potassium acetate. The amount of the alkali metal carboxylate is preferably 20 to 200 parts by weight of the alkali metal carboxylate per 100 parts by weight of the cellulose ether. If an aliphatic monocarboxylic acid anhydride and a di- or tricarboxylic acid anhydride are used for esterifying the cellulose ether, the two anhydrides may be introduced into the reaction vessel at the same time or separately one after the other. The amount of each anhydride to be introduced into the reaction vessel is determined depending on the desired degree of esterification to be obtained in the final product, usually being 1 to 10 times the stoichiometric amounts of the desired molar degree of substitution of the anhydroglucose units by esterification. The mixture is generally heated at 60° C. to 110° C., preferably at 70 to 100° C., for a period of time sufficient to complete the reaction, that is, typically from 2 to 25 hours, more typically from 2 to 8 hours. The cellulose ether as the starting material is not always soluble in the aliphatic carboxylic acid, but can only be dispersed in or swollen by the aliphatic carboxylic acid, especially when the degree of substitution in the cellulose ether is relatively small. The esterification reaction can take place even with such a dispersed or swollen cellulose ether and, as the esterification reaction proceeds, the cellulose ether under reaction generally dissolves in the reaction medium, to finally give a homogeneous solution.

The resulting reaction product mixture comprises the esterified cellulose ether, typically an aliphatic carboxylic acid used as a reaction medium, typically a reaction catalyst, such as an alkali metal carboxylate, typically residual amounts of one or more esterification agents and by-products, such as an aliphatic monocarboxylic acid and/or a di- or tricarboxylic acid. The resulting reaction product mixture generally comprises from 3 to 60, typically from 7 to 35 weight percent of the esterified cellulose ether; from 10 to 95, typically from 20 to 70 weight percent of an aliphatic carboxylic acid, from 1 to 50; typically from 5 to 30 weight percent of a reaction catalyst, such as an alkali metal carboxylate, and from 0.1 to 50, typically from 2 to 40 weight percent of minor components, such as non-reacted anhydrides of an aliphatic monocarboxylic acid and/or of a di- or tricarboxylic acid.

Subsequently, steps (i) to (iv) for recovering the esterified cellulose ether from the reaction product mixture are carried out as described below. In the process of the present invention steps (i), (ii), (iii) and (iv) will be carried out in sequence, however, it is to be understood that additional steps can be carried out before, between or after steps (i)-(iv). For example, in one embodiment of the invention one or more additional steps can be conducted between steps (ii) and (iii). In another embodiment one or more additional steps can be carried out after step (iv). In yet another embodiment repeated cycles of steps (iii) and (iv) can be carried out, e.g., a sequence of step (iii), step (iv), step (iii), step (iv), and so on can be conducted.

In step (i) of the process of the present invention the above-described reaction product mixture is contacted with an aqueous liquid to precipitate the esterified cellulose ether from the reaction product mixture. At least 55 weight percent and up to 100 percent of the aqueous liquid is water. The aqueous liquid may additionally comprise a minor amount of an organic liquid diluent; however, the aqueous liquid should comprise at least 55, preferably at least 65, more preferably at least 75, most preferably at least 90, and particularly at least 95 weight percent of water, based on the total weight of the aqueous liquid. Preferably the aqueous liquid consists of water.

Preferably the reaction product mixture is contacted with an amount of from 5 to 400, more preferably from 8 to 300, most preferably from 10 to 100, and particularly from 12 to 80 weight parts of aqueous liquid per weight part of cellulose ether used for esterification. The weight ratio [aqueous liquid/reaction product mixture excluding aqueous liquid] is generally up to 150/1, preferably up to 75/1, and more preferably up to 25/1. The weight ratio [aqueous liquid/reaction product mixture excluding aqueous liquid] is generally at least 0.5/1.0, preferably at least 1.0/1.0, and more preferably at least 1.5/1.0. The reaction product mixture comprising the esterified cellulose ether generally has a temperature of from 60° C. to 110° C. It can be contacted with the aqueous liquid without previous cooling of the reaction product mixture. The temperature of the aqueous liquid preferably is from 1 to 90° C., more preferably from 5 to 40° C. Step (i) can be carried out in a known manner by loading aqueous liquid to the reaction mixture, typically under mild agitation. However, step (i) is preferably conducted as described in the co-pending International patent application PCT/US13/030394, filed 12 Mar. 2013, published on 3 Oct. 2013 as WO 2013/148154, which is incorporated herein by reference. According to the method described in PCT/US13/030394 the combination of aqueous liquid and the reaction product mixture is subjected to a shear rate of at least 800 $s^{-1}$, preferably at least 1500 $s^{-1}$, more preferably at least 3000 $s^{-1}$, and most preferably at least 8000 $s^{-1}$. The shear rate is generally up to 300,000 $s^{-1}$, typically up to 200,000 s$^{-1}$, more typically up to 100,000 s$^{-1}$ and most typically up to 50,000 s$^{-1}$. Applying such shear rates is useful for providing esters of cellulose ethers which are non-tacky and of fine particle size upon precipitation and isolation from the reaction product mixture. Such shear rate can be obtained in a high shear device, such as a high shear mixer, also known as rotor-stator mixer or homogenizer, high shear mill or high shear pump. A high shear device commonly comprises a rotor in combination with a stationary part of the shear device, also referred to as "stationary", such as a stator or housing. The stationary creates a close-clearance gap between the rotor and itself and forms a high-shear zone for materials in this gap. The stationary can include single or multiple rows of openings, gaps or teeth to induce a kind of shear frequency and increased turbulent energy.

One metric for the degree or thoroughness of mixing is the shearing force generated by a mixing device with a high tip speed. Fluid undergoes shear when one area of fluid travels with a different velocity relative to an adjacent area. The tip speed of the rotor is a measure of the kinetic energy generated by the rotation according to the formula:

Tip speed=rotation rate of rotor×rotor circumference.

The shear rate is based on the inverse relationship between the gap distance between the rotor and the stationary part of the shear device which is commonly referred to as the stator or housing. In case the high shear device is not equipped with a stator, the inner wall of a precipitation vessel serves as a stator.

Shear rate=Tip speed/gap distance between outer diameter of rotor and stationary. Step (i) of the process of the present invention is preferably conducted in a shear device running at a tip speed of at least 4 m/s, preferably at least 8 m/s, and more preferably at least 12 m/s. The tip speed is generally up to 100 m/s, typically up to 50 m/s, and more typically up to 30 m/s.

A further shearing is induced by a velocity difference between the tip velocity of the fluid at the outside diameter of the rotor and the velocity at the centre of the rotor. Aqueous liquid and the above described reaction product mixture comprising the esterified cellulose ether can be fed as separate fluid streams or as a combined fluid stream to the high shear device.

High shear devices are also called high shear mixers and encompass different geometries such as colloid mills, toothed-devices, axial-discharge and radial-discharge rotor stator mixers (Atiemo-Obeng, V. A. and Calabrese, R. V., 2004. "Rotor-stator mixing devices" in Handbook of Industrial Mixing: Science and Practice, E. L. Paul, V. A. Atiemo-Obeng and S. M. Kresta, John Wiley & Sons, Hoboken, N.J., USA.). The high shear device can be used in a continuous or batch operation. Preferably the high-shear device is an in-line high-shear device. In an inline high-shear device, generally a mixing head is contained in a housing driven through a seal with an inlet at one end and an outlet at the other end or on the circumference of the device. The esterified cellulose ether and aqueous liquid are preferably drawn through the mixing head in a continuous stream. Equilibrium mixing is typically achieved by passing the combination of aqueous liquid and the reaction product mixture comprising the esterified cellulose ether through the inline high-shear device more than once. Known vendors for high shear devices such as rotor-stator mixers, high shear mills or high shear pumps are Herbst Maschinenfabrik GmbH, Germany (model series HI), Charles Ross & Son Company, USA (model series 400DL, 100LCI, 100, HSD, 700), IKA GmbH & Co. KG, Germany (model series Ultra-Turrax, UTL, DR, MK, colloid mills MK), Scott Turbon Mixer Inc., USA (models series L-HSM, HSM, IL, HSP, Scott top, bottom and floor mounted mixers), Fryma-Koruma AG, Switzerland (model series DIL), and BWS Technology, Germany (model series Supraton and Reflector). An example of a useful high shear device is disclosed in U.S. patent application 2011/0091360.

In one embodiment of the invention the mixture obtained in step (i) by contacting the reaction product mixture with the aqueous liquid has a temperature of from 28 to 95° C., typically from 30 to 70° C., before the mixture is subjected to step (ii). Such temperature can be achieved by contacting hot product mixture with optionally heated aqueous liquid or by heating the combination of the product mixture and the aqueous liquid.

In another embodiment of the invention the mixture obtained in step (i) by contacting the reaction product mixture with the aqueous liquid is adjusted to a temperature of 27° C. or less, preferably from 5° C. to 25° C., more preferably from 10° C. to 23° C., before the mixture is subjected to step (ii). Such temperature can be achieved by cooling the reaction product mixture before it is contacted with the aqueous liquid, by cooling the aqueous liquid or, more typically by controlling the temperature of the mixture obtained in step (i) and cooling the mixture if it is above 27° C. The temperature control in step (i) can be conducted at the beginning, during or at the end of step (i).

In step (ii) of the process of the present invention the precipitated esterified cellulose ether is isolated from the remainder of the mixture obtained in step (i). In one embodiment of the invention the mixture that is subjected to step (ii) has a temperature of from 28 to 95° C., typically from 30 to 70° C. In another embodiment of the invention the mixture that is subjected to step (ii) has a temperature of 27° C. or less, preferably from 5° C. to 25° C., more preferably from 10° C. to 23° C. Step (ii) of isolating the precipitated esterified cellulose ether from the mixture obtained in step (i) can be conducted in a known manner in a separation device, such as by centrifugation or filtration or upon settling by decantation or a combination thereof. Preferred separation devices are filtration devices or decanters, such as vacuum filters, pressure filters, screen and filter centrifuges or decanter centrifuges.

In one embodiment of the invention step (iii) is carried out as described below immediately after step (ii). This embodiment of the invention is particularly advantageous if after steps (i) and (ii) esterified cellulose ether of fine particle size and relatively high purity is obtained, for example when in step (i) the combination of aqueous liquid and the reaction product mixture is subjected to a shear rate of at least 800 s$^{-1}$ as described further above.

On the other hand, if the esterified cellulose ether obtained in step (ii) has a relatively low purity, for example, if the isolated esterified cellulose ether is sticky, it may be advantageous to subject the esterified cellulose ether obtained in step (ii) to a purification step before it is subjected to step (iii) as described below. Therefore, in another embodiment of the invention, after step (ii) and prior to step (iii), the isolated esterified cellulose ether is washed with an aqueous liquid having a temperature of less than 28° C., preferably from 15 to 25° C., until the isolated esterified cellulose ether does not display a substantial stickiness any longer. One or more washing steps with aqueous liquid having a temperature of less than 28° C. may be useful. For example, washing can be conducted by suspending the isolated esterified cellulose ether in an aqueous liquid to provide a suspension and recovering the esterified cellulose ether from the suspension in the same manner as described in steps (iii) and (iv) below, except that the suspension has a temperature of less than 28° C., preferably from 15 to 25° C.

In step (iii) of the process of the present invention the isolated esterified cellulose ether is suspended in an aqueous liquid to provide a suspension that has a temperature of at least 28° C., preferably at least 30° C., more preferably at least 35° C., even more preferably at least 50° C., most preferably at least 55° C., and particularly at least 70° C. The aqueous liquid typically has a temperature of up to 95° C., more typically up to 90° C., and most typically up to 85° C. At least 55 weight percent and up to 100 percent of the aqueous liquid is water. The aqueous liquid may additionally comprise a minor amount of an organic liquid diluent; however, the aqueous liquid should comprise at least 55, preferably at least 65, more preferably at least 75, most preferably at least 90, and particularly at least 95 weight percent of water, based on the total weight of the aqueous liquid. Preferably the aqueous liquid consists of water. In step (iii) the isolated esterified cellulose ether is preferably contacted with 2 to 400 weight parts, more preferably 3 to 300 weight parts, and most preferably 4 to 150 weight parts of aqueous liquid per weight part of esterified cellulose ether. The esterified cellulose ether is preferably suspended in the aqueous liquid under agitation, such as high-shear or low-shear blending. In one embodiment a shear rate of from 800 to 300,000 $s^{-1}$, preferably from 1500 to 200,000 $s^{-1}$, more preferably from 3000 to 100,000 $s^{-1}$, and most preferably from 8000 to 50,000 $s^{-1}$ is applied, as described for step (i) above for suspending the esterified cellulose ether in the washing liquor. High-shear devices as described for step (i) may be used. In another embodiment of the invention a shear rate of less than 800 $s^{-1}$, typically from 50 to 500 $s^{-1}$ and more typically from 100 to 400 $s^{-1}$ is applied. It is essential that in step (iii) the suspension reaches a temperature of at least 28° C. at least one point in time before the esterified cellulose ether is recovered from the suspension. Preferably the esterified cellulose ether is kept at least 30 seconds, more preferably at least 45 seconds, and most preferably at least 60 seconds, and typically up to 10 minutes, more typically up to 5 minutes in suspension at a temperature of at least 28° C. To provide the suspension, the temperature of the isolated esterified cellulose ether and/or the aqueous liquid can be adjusted in a known manner that the resulting suspension has a temperature of at least 28° C. Alternatively, temperature adjustment to at least 28° C. can be achieved in a known manner after the suspension has been produced, for example by electrical heating or steam injection or in a jacketed container comprising a heat transfer fluid.

After the suspension has reached a temperature of at least 28° C., the esterified cellulose ether can be recovered from the suspension in a subsequent step (iv) while the suspension still has a temperature of at least 28° C. In another embodiment of the invention, the suspension can be cooled or allowed to cool to a temperature of less than 28° C. before the esterified cellulose ether is recovered from the suspension in step (iv). Step (iv) can be conducted in a known manner in a separation device, such as by centrifugation or filtration or upon settling by decantation. Preferred separation devices are filtration devices or decanters, such as vacuum filters, pressure filters, screen and filter centrifuges or decanter centrifuges or a combination thereof. In step (iv) a purified esterified cellulose ether is obtained.

The sequence of steps (iii) and (iv) can be repeated once or several times, preferably once to 5 times. E.g., a sequence of step (iii), step (iv), step (iii) and step (iv) can be conducted.

Surprisingly, it has been found that the separability of the esterified cellulose ether from the aqueous liquid is improved and its loss on drying (LOD) is reduced when in step (iii) a suspension is produced that has a temperature of at least 28° C. instead of a lower temperature. A reduced LOD is very advantageous because the recovered esterified cellulose ether contains less aqueous liquid and therefore fewer water-soluble impurities like sodium acetate or acetic acid. This leads to higher product yield because the product does not need to be purified as intensely or not as often as in the prior art process to achieve the esterified cellulose ether with very high purity. Intensive purification, e.g., by washing, results in increased product loss. Moreover, a reduced LOD is advantageous because less time and energy is required to dry the purified esterified cellulose ether.

It has been found that coarser particles of esterified cellulose ether are formed when the suspension has a temperature of at least 28° C. in step (iii), which leads to improved separability by decantation, centrifugation, filtration or a combination thereof. Moreover, the separated washing liquor has a reduced turbidity, which is an indication that a reduced amount of esterified cellulose ether particles remains in the washing liquor. This leads to an improved yield of the esterified cellulose ether. It has also surprisingly been found that the esterified cellulose ether has an improved friability upon drying when steps (iii) and (iv) are conducted once or repeatedly such that the suspension provided in step (iii) has a temperature of at least 28° C. instead of a lower temperature. It has even more surprisingly been found that the salt content in the esterified cellulose ether that has been subjected to steps (iii) and (iv) according to the process of the present invention is even lower than the salt content in the esterified cellulose ether that has been treated in a comparable process, except that the suspension in step (iii) has a temperature of less than 28° C. The salt content in the esterified cellulose ether is an indication of the purity of the esterified cellulose ether.

In one embodiment of the invention after step (iv) or, in the case of repeated cycles of steps (iii) and (iv), after the last step (iv), the recovered esterified cellulose ether is subjected to a step (v) of suspending the esterified cellulose ether in an aqueous liquid to provide a suspension having a temperature of up to 27° C., preferably from 15 to 25° C., and a step (vi) of recovering the esterified cellulose ether from the suspension of step (v). Apart from a different temperature of the suspension, the type and amount of aqueous liquid and the conditions in step (v) are preferably as described above for step (iii). Step (vi) can be conducted in the same manner as step (iv) described further above.

The purified esterified cellulose ether can subsequently be dried in a known manner, for example in an oven or by forced air drying. Typical drying temperatures are from 20 to 200° C., more typically from 40 to 150° C. Typical drying periods are from 5 minutes to 24 hours, more typically from 15 minutes to 10 hours. Drying is improved due to the low LOD of the material, requiring less time and energy to dry.

To achieve the improvements in step (iii) described above, step (iii) does not have to be preceded by steps (i) and (ii) but can be conducted separately from them.

Accordingly, one embodiment of the present invention relates to a method of improving the separability of an esterified cellulose ether from an aqueous liquid in a process which comprises the steps of suspending an esterified cellulose ether to be purified in an aqueous liquid to provide a suspension, and recovering the esterified cellulose ether from the suspension by filtration, centrifugation, decantation or a combination thereof, wherein the temperature of the suspension is adjusted to at least 28° C. before the esterified cellulose ether is recovered from the suspension.

Another embodiment of the present invention relates to a method of reducing the loss on drying of a humid mass of a solid esterified cellulose ether which comprises the steps of suspending the humid mass of solid esterified cellulose ether in an aqueous liquid to provide a suspension, and recovering the esterified cellulose ether from the suspension by filtration, centrifugation, decantation or a combination thereof, wherein the temperature of the suspension is adjusted to at least 28° C. before the esterified cellulose ether is recovered from the suspension. A "solid esterified cellulose ether" means an esterified cellulose ether that is solid at 25° C. and atmospheric pressure. A "humid mass of solid esterified cellulose ether", also designated as "wet mass", means a mass that contains aqueous liquid trapped in the solid mass of esterified cellulose ether that is not removed by filtration, centrifugation, decantation or a combination thereof but only by drying, e.g. by means of heat. For the purpose of the present invention the humidity, i.e., the weight percentage of volatile components in the humid mass of solid esterified cellulose ether, corresponds to the Loss on Drying (LOD). The LOD in percent is calculated as $(\text{weight}_{wet}-\text{weight}_{dry})/\text{weight}_{wet} \times 100$, wherein $\text{weight}_{wet}$ is the weight of the humid mass of solid esterified cellulose ether and $\text{weight}_{dry}$ is the weight of the dry solid esterified cellulose ether. Prior to the process of the present invention the humid mass of esterified cellulose ether typically has a Loss on Drying (LOD) of from 50 to 98 percent, more typically from 55 to 80 percent. After the process of the present invention, i.e., after recovery of the esterified cellulose ether from the suspension by filtration, centrifugation, decantation or a combination thereof without drying step, the esterified cellulose ether typically has a Loss on Drying (LOD) of from 35 to 65 percent, more typically from 40 to 60 percent.

By the steps of suspending the humid mass of solid esterified cellulose ether in an aqueous liquid to provide a suspension, adjusting the temperature of the suspension to at least 28° C. and recovering the esterified cellulose ether from the suspension by filtration, centrifugation, decantation or a combination thereof, generally a reduction in LOD of at least 12 percent, typically at least 15 percent, more typically at least 20 percent, and under optimized conditions even at least 25 percent or even at least 30 percent, is achieved, based on the starting LOD.

Preferred embodiments of the method of improving the separability of an esterified cellulose ether from an aqueous liquid and of the method of reducing the loss on drying of a humid mass of a solid esterified cellulose ether are those described above for steps (iii) and (iv) in the process described above.

Some embodiments of the invention will now be described in detail in the following Examples.

EXAMPLES

Unless otherwise mentioned, all parts and percentages are by weight. In the Examples the following test procedures are used.

Content of Ether and Ester Groups

The content of ether groups in the hydroxypropyl methyl cellulose acetate succinate (HPMCAS) is determined in the same manner as described for "Hypromellose", United States Pharmacopeia and National Formulary, USP 35, pp 3467-3469.

The ester substitution with acetyl groups ($-CO-CH_3$) and the ester substitution with succinoyl groups ($-CO-CH_2-CH_2-COOH$) are determined according to Hypromellose Acetate Succinate, United States Pharmacopia and National Formulary, NF 29, pp. 1548-1550". Reported values for ester substitution are corrected for volatiles (determined as described in section "loss on drying" in the above HPMCAS monograph).

Determination of the Turbidity of the Washing Liquor

The turbidity was analyzed with the Turbidimeter 2100AN (wolfram lamp, German catalogue number 47089-00) (Hach Company, Loveland, Colo., USA). The turbidity is the analysis of the scattered light through a sample cell (diameter: 24 mm) and is given in NTUs (nephelometric turbidity units) according to USEPA method 180.1. The analysis was performed against a formazin standard ranging from <0.1 NTU to 7500 NTU (StablCal™ catalogue number 2659505). A USEPA method 180.1 filter module (catalogue number 3031200) was used.

Determination of the Loss on Drying (LOD)

The LOD in percent is $(\text{weight}_{wet}-\text{weight}_{dry})/\text{weight}_{wet} \times 100$. The LOD of HPMCAS was measured using an Ohaus MB35 moisture balance at 130° C.

Conductivity Measurement

The Conductivity of the washed HPMCAS was measured by re-suspending 165 g (based on dry weight) of the washed and filtered HPMCAS in 1000 g of water and measuring the conductivity of the liquid phase of the suspension using an ccumet™ 13-620-156 conductivity probe, which is commercially available from Fisher Scientific, USA. At the conductivity measurement the liquid phase of the suspension had the temperature of 20° C.

Determination of the Sodium Ions

The concentration of the sodium ions in the washed HPMCAS was measured by re-suspending 165 g (based on dry weight) of the washed and filtered HPMCAS in 1000 g of water and measuring the sodium ion concentration of the liquid phase of the suspension using an Orion™ 8611B sodium ion selective probe, which is commercially available from Fisher Scientific, USA. The measured ppm of sodium ions were used for calculating the sodium ion concentration, based on dry weight of HPMCAS. In Table 2 below the calculated sodium ion concentrations are listed.

Example 1

Production of a Reaction Product Mixture Comprising Hydroxypropyl Methyl Cellulose Acetate Succinate (HPMCAS)

208.1 parts by weight of glacial acetic acid, 84.5 parts by weight of acetic anhydride, 100 parts by weight of a hydroxypropyl methylcellulose (HPMC) with a moisture content of 2% by weight, 10.6 parts by weight of succinic anhydride and 95.0 parts by weight of sodium acetate (water free) were introduced into a reaction vessel under thorough stirring.

The HPMC had a methoxyl substitution of 28.8% and a hydroxypropoxyl substitution of 8.8%, measured according to the United States Pharmacopeia and National Formulary, Hypromellose (hydroxproyl methyl cellulose), which corresponds to a $DS_{methoxyl}$ of 1.88 and an $MS_{hydroxypropoxyl}$ of 0.24. The HPMC had a viscosity of about 3 mPa·s, measured as a 2% solution in water at 20° C. according to ASTM D2363-79 (Reapproved 2006). The weight average molecular weight of the HPMC was about 20,000 Dalton. The HPMC is commercially available from The Dow Chemical Company as Methocel E3 LV Premium cellulose ether.

The mixture was heated at 85° C. with agitation for 3.0 hours to effect esterification.

Precipitation and Isolation of HPMCAS from the Reaction Product Mixture (Steps (i) and (ii)), Followed by Purification in Repeated Washing Steps After 3.0 hour reaction time the esterified HPMC product in the hot reaction mixture was precipitated by transferring the hot reaction mixture slowly into 5750 parts of water with a temperature of about 20° C. through a high-shear device installed in the side-arm of a recirculated agitated vessel. The precipitated HPMCAS was separated from the remainder of the aqueous slurry.

The isolated HPMCAS was subjected to several cycles of suspending HPMC in water having a temperature of 15 to 20° C. and subsequently separating the HPMC from the suspension. The final HPMCAS wet cake consisted of about 37% HPMCAS, about 63% water and less than 0.5% by-products (free acids, sodium salt, etc.). The isolated HPMCAS had a loss on drying (LOD) of 63 weight percent. The HPMCAS had a succinate substitution of 7.3% and an acetate substitution of 12.3%, based on the dry weight of HPMCAS.

Steps (iii) and (iv): Suspending the HPMCAS in Aqueous Liquid and Separating the HPMCAS from the Suspension 81.08 g of wet HPMCAS obtained after precipitation and isolation of HPMCAS from the reaction product mixture (steps (i) and (ii)), followed by purification in repeated washing steps, as described above, was suspended in 1658.92 g of deionized water. The suspension was sheared with an Ultra-Turrax stirrer (shaft S50 N G 45 F) for 2 min at 10,000 rpm. This suspension was divided in 4 parts (aliquots) and heated to different temperatures for 10 min under stirring using an anchor agitator. The anchor agitator had a speed of 300 rpm. Then the suspension was filtrated through a G1 frit, the filterability qualitatively assessed and the turbidity of the filtrate was measured.

TABLE 1

| Suspension Temperature (° C.) | Filterability | Turbidity of the Filtrate in NTU |
|---|---|---|
| 25.6 (comparative) | good | 76 |
| 30.6 | good | 68 |
| 35.7 | good | 46 |
| 40.3 | good | 53 |
| 45.2 | good | 42 |
| 50.4 | very good | 36 |
| 55.7 | very good | 19 |
| 77.5 | very good | 0.7 |

The results in Table 1 above illustrate the improved filterability of the HPMCAS and the decreased turbidity of the filtrate, which is an indication of the increased yield in the filtration operation, when in step (iii) the HPMCAS is suspended in an aqueous liquid to provide a suspension having a temperature of at least 28° C., as claimed in the present invention.

Example 2

The process of Example 1 was repeated except that different amounts of glacial acetic acid, acetic anhydride, succinic anhydride and sodium acetate were used resulting in a wet cake consisting of about 33 weight percent HPMCAS, about 67 weight percent water and less than 0.5 weight percent by-products (free acids, sodium etc.). The HPMCAS had a succinate substitution of 10.5% and an acetate substitution of 9.6%, based on the dry weight of HPMCAS.

HPMCAS was precipitated and isolated from the reaction product mixture, followed by purification in repeated washing steps, as described above in Example 1. Steps (iii) and (iv) of the process of the present invention, i.e., suspending the HPMCAS in aqueous liquid and separating the HPMCAS from the suspension was carried out as follows: 500 g of wet HPMCAS having an LOD of 67 weight percent was suspended in 1 L of deionized water of a temperature of 90-98° C. followed by decantation, as listed in Table 2 below. The suspension was agitated in a 2 L Waring blender equipped with a Variac power transformer. The blender was run at about 35% power, which was sufficient to prevent massing, but did not significantly reduce particle size. The temperature of the resulting suspension was monitored and is listed in Table 2 below. It was lower than 90-98° C. due to the lower temperature of the HPMCAS. After the last cycle of suspending the HPMCAS in hot water followed by decantation, the HPMCAS was repeatedly suspended in water of a temperature of 20° C. followed by filtration through a P8 Fisher coarse filter paper in a 1 L filter funnel, as listed in Table 2 below.

In the comparative procedure with cold water the HPMCAS was repeatedly suspended in water of a temperature of 20° C., followed by filtration. Each suspension of HPMCAS in cold water was subjected to vacuum filtration through a P8 Fisher coarse filter paper in a 1 L filter funnel.

After the last suspension/separation cycle the HPMCAS in the filter funnel was rinsed once with water of a temperature of 20° C.

The results are listed in Table 2 below. The results illustrate that the loss on drying (LOD) of the washed esterified cellulose ether is improved when the washing step (iii) is conducted once or repeatedly with washing liquor having a temperature of at least 28° C. instead of a lower temperature. Moreover, conductivity and sodium ion concentration in the liquid phase of the re-suspended esterified cellulose ether is lower when the washing step (iii) is conducted once or repeatedly with washing liquor to provide a suspension having a temperature of at least 28° C. instead of a lower temperature. The reduced conductivity and sodium ion concentration illustrate the improved purity of the esterified cellulose ether that has been washed according to the process of the present invention.

TABLE 2

| | Weight (g) | Suspension temp. (° C.) | Suspension time (min) | LOD (%) | Conductivity (µS) | Na$^+$ Conc. (ppm) |
|---|---|---|---|---|---|---|
| Washing Process according to the Invention | | | | | | |
| wet cake | 500 | | | 67 | | |
| Hot water 1 (90-98° C.) | 1000 | >65 | 1 | | 251 | 1949 |

TABLE 2-continued

|  | Weight (g) | Suspension temp. (° C.) | Suspension time (min) | LOD (%) | Conductivity (μS) | Na+ Conc. (ppm) |
|---|---|---|---|---|---|---|
| Hot water 2 | 1000 | >80 | 5 |  | 133 | 1309 |
| Cold water 1 (20° C.) | 1000 | 36 | 3.5 |  | 58 | 451 |
| Cold water 2 | 1000 | 21 | 3 |  | 28 | 208 |
| Cold water rinse (in filter funnel) | 1000 | — | — | 45.2 |  |  |
| Comparative Washing Process with Cold Water | | | | | | |
| wet cake | 500 |  |  | 66.9 |  |  |
| Cold water 1 (20° C.) | 1000 | 21 | 1 |  | 385 | 2323 |
| Cold water 2 | 1000 | 21 | 5 |  | 246 | 1484 |
| Cold water 3 | 1000 | 21 | 3.5 |  | 127 | 766 |
| Cold water 4 | 1000 | 21 | 3 |  | 102 | 615 |
| Cold water rinse (in filter funnel) | 1000 | — | — | 59.7 |  |  |

What is claimed is:

1. A process for recovering an esterified cellulose ether from a reaction product mixture obtained from a reaction of (a) a cellulose ether with (b) a di- or tricarboxylic acid anhydride or a combination of an aliphatic monocarboxylic acid anhydride and a di- or tricarboxylic acid anhydride, wherein the process comprises the steps of
   (i) contacting the reaction product mixture with an aqueous liquid to precipitate the esterified cellulose ether from the reaction product mixture,
   (ii) isolating the precipitated esterified cellulose ether from the mixture obtained in step (i),
   (iii) suspending the isolated esterified cellulose ether in an aqueous liquid to provide a suspension having a temperature of at least 50° C., and
   (iv) recovering the esterified cellulose ether from the suspension of step (iii).

2. The process of claim 1 wherein the aqueous liquid is water.

3. The process of claim 1 wherein the suspension in step (iii) has a temperature of from 50 to 95° C.

4. The process of claim 3 wherein the suspension in step (iii) has a temperature of from 55 to 90° C.

5. The process of claim 1 wherein in step (i) the combination of aqueous liquid and the reaction product mixture is subjected to a shear rate of at least 800 s$^{-1}$.

6. The process of claim 1 wherein in step (i) the temperature of the mixture obtained by contacting the reaction product mixture with aqueous liquid is adjusted to 27° C. or less before it is subjected to the step (ii).

7. The process of claim 1 wherein in step (iii) the esterified cellulose ether is contacted with 2 to 400 weight parts of aqueous liquid per weight part of esterified cellulose ether.

8. The process of claim 1 wherein the isolated esterified cellulose ether is subjected to repeated cycles of steps (iii) and (iv).

9. The process of claim 1 wherein after step (iv) or, in the case of repeated cycles of steps (iii) and (iv), after the last step (iv), the recovered esterified cellulose ether is subjected to the steps of
   (v) suspending the esterified cellulose ether in an aqueous liquid to provide a suspension having a temperature of up to 27° C., and
   (vi) recovering the esterified cellulose ether from the suspension of step (v).

10. The process of claim 1 wherein the reaction product mixture has been obtained from a reaction of (a) a cellulose ether with (b) a di- or tricarboxylic acid anhydride or a combination of an aliphatic monocarboxylic acid anhydride and a di- or tricarboxylic acid anhydride in the presence of (c) an aliphatic carboxylic acid and (d) an alkali metal carboxylate.

11. The process of claim 1 wherein the reaction product mixture has been obtained from the reaction of (a) an alkyl cellulose, hydroxyalkylcellulose or hydroxyalkyl alkylcellulose with (b) an aliphatic monocarboxylic acid anhydride selected from the group consisting of acetic anhydride, butyric anhydride and propionic anhydride and a di- or tricarboxylic acid anhydride selected from the group consisting of succinic anhydride, phthalic anhydride and trimellitic anhydride.

12. The process of claim 1 wherein the esterified cellulose ether is hydroxypropyl methyl cellulose acetate succinate. .

13. A process for preparing an ester of a cellulose ether wherein (a) a cellulose ether is reacted with (b) a di- or tricarboxylic acid anhydride or a combination of an aliphatic monocarboxylic acid anhydride and a di- or tricarboxylic acid anhydride, and the esterified cellulose ether is recovered from the reaction product mixture according to the process of claim 1.

14. A method of improving the separability of hydroxypropyl methyl cellulose acetate succinate from an aqueous liquid in a process comprising the steps of
   suspending hydroxypropyl methyl cellulose acetate succinate to be purified in an aqueous liquid to provide a suspension, and
   recovering the hydroxypropyl methyl cellulose acetate succinate from the suspension by filtration, centrifugation, decantation or a combination thereof,
   wherein the temperature of the suspension is adjusted to at least 50° C. before the hydroxypropyl methyl cellulose acetate succinate is recovered from the suspension.

15. A method of reducing the loss on drying of a humid mass of a solid hydroxypropyl methyl cellulose acetate succinate comprising the steps of
   suspending the humid mass of solid hydroxypropyl methyl cellulose acetate succinate in an aqueous liquid to provide a suspension, and
   recovering the hydroxypropyl methyl cellulose acetate succinate from the suspension by filtration, centrifugation, decantation or a combination thereof, wherein the temperature of the suspension is adjusted to at least 50° C. before the hydroxypropyl methyl cellulose acetate succinate is recovered from the suspension.

* * * * *